Figure 1:
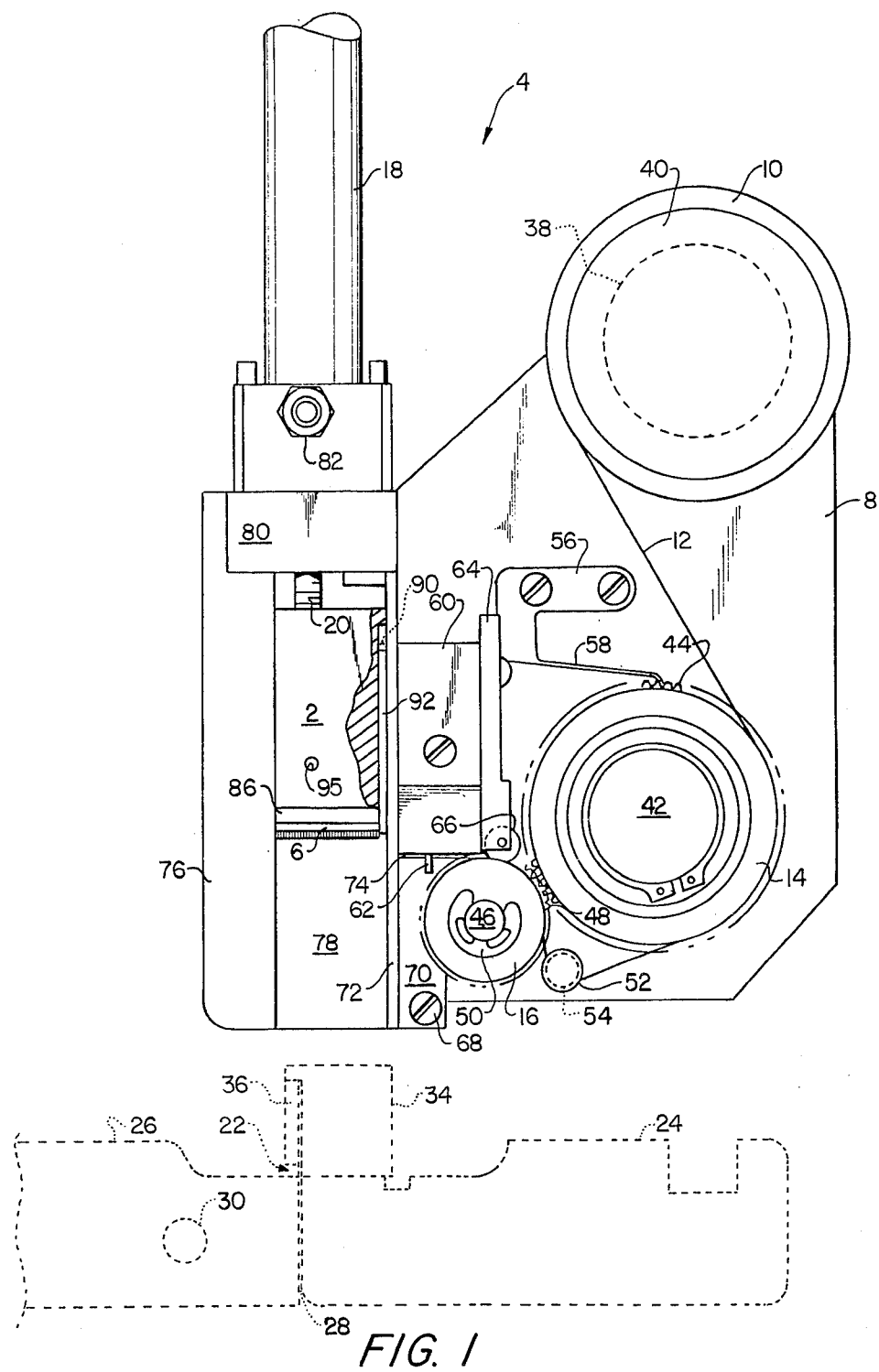

United States Patent [19]

Berube

[11] 4,430,145
[45] Feb. 7, 1984

[54] SPLICER PRESSER PAD

[75] Inventor: Richard G. Berube, Marlborough, Mass.

[73] Assignee: King Instrument Corporation, Westboro, Mass.

[21] Appl. No.: 461,261

[22] Filed: Jan. 26, 1983

[51] Int. Cl.³ .......................... B31F 5/06; B65C 9/36
[52] U.S. Cl. .................................. 156/497; 156/506; 156/518; 156/520; 156/DIG. 42; 242/56 R
[58] Field of Search ............... 156/497, 502, 505, 506, 156/518, 520, DIG. 31, DIG 42; 242/56 R, 58.1

[56] References Cited

U.S. PATENT DOCUMENTS

| | | | |
|---|---|---|---|
| 3,029,180 | 4/1962 | Laliberte | 156/502 |
| 3,554,842 | 1/1971 | Byrt | 156/505 |
| 3,753,835 | 8/1973 | King | 156/506 |
| 4,028,166 | 6/1977 | Leonhart | 156/497 |
| 4,204,898 | 5/1980 | King | 156/502 |
| 4,385,959 | 5/1983 | Goguen | 156/506 |

Primary Examiner—Michael G. Wityshyn
Attorney, Agent, or Firm—Schiller & Pandiscio

[57] ABSTRACT

An improved pressure pad attached to a plunger mechanism of a splicer utilized on an automatic cassette tape loading machine. The pad has a multiplicity of intersecting slots in its bottom surface and at least one aperture penetrating its thickness. The aperture is connected to a vacuum passageway so as to provide communication between the slots and a vacuum source. The slots provide even distribution of a suction force to the splicing tape as it is applied to the tapes to be spliced.

5 Claims, 2 Drawing Figures

SPLICER PRESSER PAD

This invention relates to tape splicing apparatus and more particularly to apparatus for splicing two elongated webs, e.g., two magnetic or video tapes or two pieces of photographic film, by means of an adhesive-coated splicing tape. More specifically, it pertains to a tape splicer plunger that utilizes an improved pressure pad member having a network of very narrow slots in its exposed surface. The invention is described hereinafter as it would be used in a machine for splicing and winding magnetic tape into a tape cassette.

THE PRIOR ART

U.S Patent No. 3,753,835, issued Aug. 21, 1973, discloses a splicing tape dispenser-applicator, commonly called a splicer, adapted to be used to splice two elongated webs such as two magnetic tapes or two pieces of photographic film by means of an elongated adhesive-coated splicing tape. The same patent discloses how the splicer is adapted for automatic operation in a machine for splicing and winding magnetic tape into tape cassettes. Further examples of this type of splicer are contained in U.S. Pat. Nos. 4,204,898, 4,061,286, 3,997,123, and 3,814,652.

The splicer disclosed in U.S. Pat. No. 3,753,835 uses a reciprocating plunger/cutter assembly to cut a piece of splicing tape and press it against the tapes to be spliced. The plunger has a resilient pressure pad attached to its bottom surface to press the piece of splicing tape down evenly without damaging the tapes to be spliced.

Normally, at least one vacuum hole penetrates the thickness of this pressure pad so as to provide means for supplying a suction pressure to the bottom surface of the plunger and pressure pad. This suction pressure holds the piece of cut splicing tape firmly in place during the splicing operation. Since the prior art pads have a smooth flat bottom surface, the suction is applied to the splicing tape primarily in the immediate vicinity of the vacuum holes, thus creating a differential pressure on the top surface of the tape. This differential pressure sometimes causes the sections of splicing tape located immediately beneath the vacuum holes to be sucked upward so as to be higher than the remaining surface of the splicing tape as it is laid down on top of the tapes to be spliced, with the result that an air bubble may be formed during the splicing operation. Although these air bubbles do not necessarily result in a defective splice, the cosmetic appearance of the resulting splice is substantially degraded. The air pockets in the resulting splice also present a problem with the endurance capability of the splice. Repeated use of the spliced tape also provides opportunities for the air bubbles in the splice to snag a foreign object and thereby destroy the splice. While this problem exists in splicing relatively narrow audio tapes, it is more acute in splicing video tapes which are substantially wider, i.e., 1.27 centimeters (0.5 inch) or more.

OBJECTS OF THE PRESENT INVENTION

Accordingly, it is a general object of this invention to provide an improved splicer plunger pressure pad which eliminates, or substantially reduces, the problems noted above.

A more specific object of the invention is to improve upon the splicer disclosed in U.S. Pat. No. 3,753,835.

Another object is to provide an improved plunger pressure pad for a splicer which evenly distributes the vacuum suction force over the entire bottom surface of the pad so as to prevent the formation of any air bubbles in the splice during the splicing operation.

A further object is to provide an improved splicer which is especially suitable for use in splicing video tape and is better capable of repetitively splicing video tape without damage than is a splicer with a pressure pad as disclosed in U.S. Pat. No. 3,753,835.

A still further object of this invention is to provide an improved splicer of the type described above which is compact, fast acting, reliable in operation, and adapted to be made at relatively low cost.

SUMMARY OF THE PRESENT INVENTION

Attainment of these objects is achieved by the improved plunger pressure pad of the present invention. The pressure pad is attached to the bottom surface of the plunger so as to form an extension thereof. The pad has a plurality of very narrow slots or kerfs which are parallel and in closely spaced relation to one another. These first slots intersect a plurality of similar second slots, which are oriented at right angles to the first slots. All of the first and second slots extend partway through the thickness of the pressure pad, resulting in small rectangular or square sections of the pad surface which are separated by the intersecting orthogonal slots.

One or more apertures extend through the pressure pad and into the plunger so as to provide vacuum passageways. These passageways allow suction pressure to be introduced to the bottom surface of the pad, since the passageways in the plunger lead to a vacuum source. The first and second slots described above function to distribute the suction force over the entire bottom surface of the plunger pad. This helps prevent the formation of air bubbles during a splicing operation. In this connection, it is to be noted that the vacuum source is adjusted so as to provide sufficient suction to properly hold the splicing tape during the splicing operation. At the same time, the improved distribution of the suction force prevents localized areas of the tape surface from being subjected to differential pressures that are large enough to produce air bubbles in the splice.

THE DRAWINGS

Figure 2:
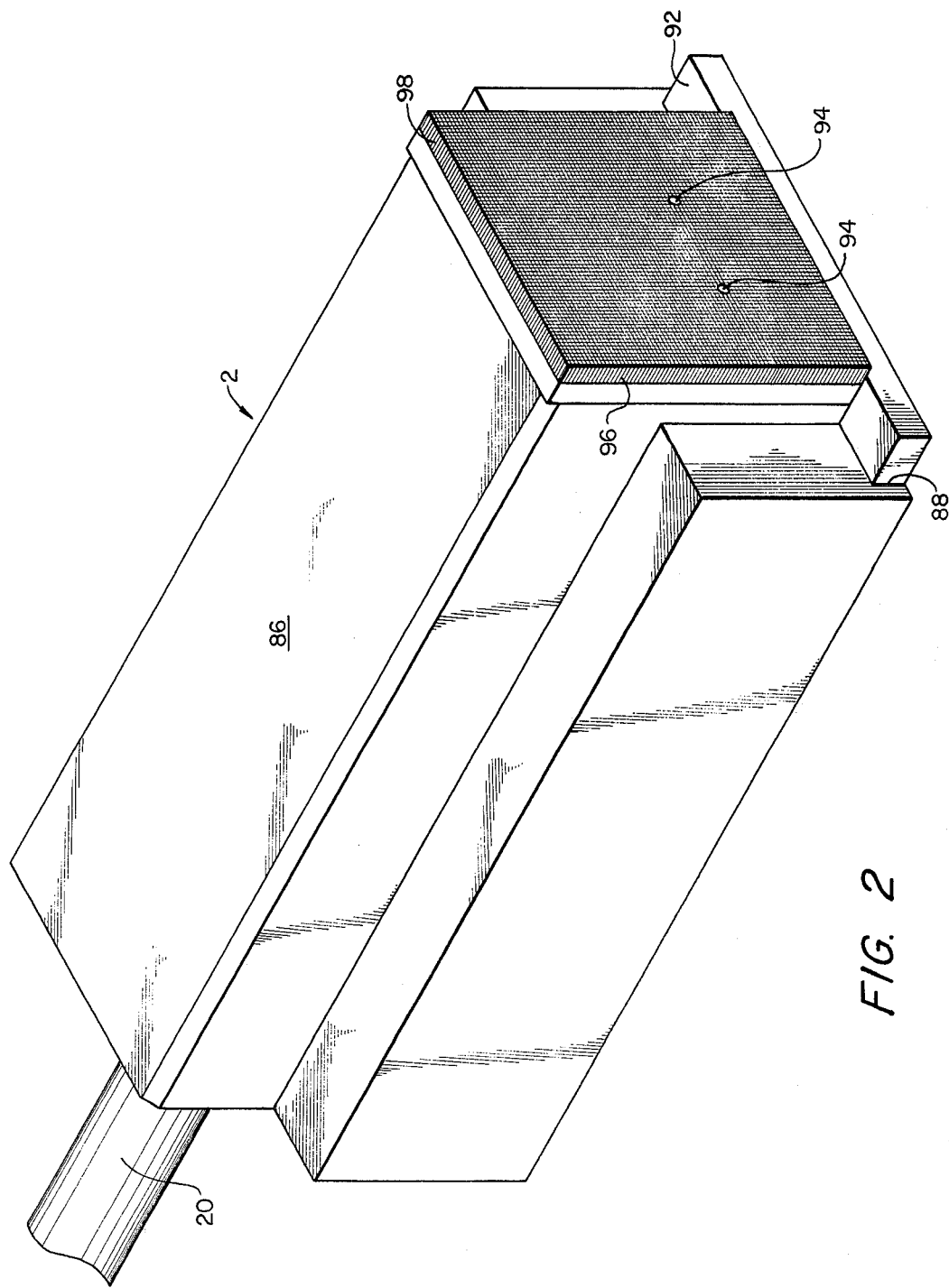

For a fuller understanding of the nature and objects of the present invention, reference should be had to the following detailed description taken in connection with the accompanying drawings wherein:

FIG. 1 is a front elevation, partly in section, of a splicer embodying the present invention disposed in operating relation to the splicing block assembly and tape cutter (shown in phantom) of a tape splicing and loading machine; and FIG. 2 is an enlarged perspective view of the plunger of the splicer showing the pressure pad attached to its bottom surface.

Turning first to FIG. 1, the preferred splicing plunger 2 is shown attached to a splicing tape dispenser-applicator or splicer 4 of the type shown in U.S. Pat. No. 3,753,835 for use on an automatic cassette loading machine (not shown). Bonded to the bottom of plunger 2 is a pressure pad 6 constructed in accordance with the present invention. Splicer 4 comprises a plate 8 on which is mounted a splicing tape supply reel 10 for storing the needed splicing tape 12, a splicing tape feed wheel 14, a smaller tape feed wheel 16, a double-acting fluid pressure actuator 18 for operating plunger 2, an actuator rod 20, and various other components described hereinafter.

The illustrated splicer 4 is designed for use with a tape splicing and winding machine of the type having a front panel (not shown) which supports a splicing block assembly 22 and the splicer 4. By way of example, but not limitation, the tape splicing and winding machine may be an automatic cassette loading machine as shown in U.S. Pat. Nos. 3,737,358, 2,753,835, 3,997,123 and 4,061,286. Although not shown, it is to be understood that such a machine further includes a rotatable supply reel shaft which supports a supply reel on which is wound a supply of magnetic tape that is to be used in filling cassettes, a cassette holder that is adapted to hold a cassette to be lowered, a rotatable take-up or winding spindle that projects out of the front panel and is adapted to mate with and drive one of the hubs of a cassette mounted in the cassette holder, a plurality of guide rollers including a roller for guiding the magnetic tape as it is played out from the supply reel to the splicing block assembly 22, and a guide roller for the same tape as it moves from the splicing block assembly 22 to a cassette mounted in the cassette holder. The supply reel shaft and take-up spindle are connected to and driven by suitable individual drive units, e.g., servo-controlled electric motors. A more detailed description of the tape splicing and winding machine is omitted for brevity and because it is not essential to comprehension of the construction and function of the present invention.

The splicing block assembly 22 comprises a stationary splicing block 24 affixed to the machine front panel and a movable splicing block 26. The two blocks are separated by a narrow gap 28. Although not shown, it is to be understood that stationary block 24 has a horizontally-extending upper surface in which is formed a single groove that extends parallel to the front panel of the tape winding and splicing machine and functions as a guideway for the magnetic tape. The movable splicing block 26 is mounted for movement toward and away from the front panel. Although not shown, it is to be understood that block 26 has a horizontally-extending upper surface that is formed with two parallel grooves which are identical in shape and extend parallel to the groove of fixed splicing block 24. These grooves all have a series of apertures formed in their bases whereby suction may be applied to tapes positioned in the grooves. The apertures in the grooves communicate via separate passageways (not shown) that are connected to a source of vacuum through suitable separately operable control valve means (not shown), whereby suction may be selectively applied to the individual grooves.

Suitable operating means (not shown) are provided for moving block 26 in and out relative to the front panel so as to selectively align either of its two grooves with the groove in block 24 for splicing purposes.

The machine also includes a knife mechanism which forms part of the splicing block assembly 22 and is used to sever a cassette leader and also the tape which is to be loaded. The knife mechanism comprises an elongate cutter blade support arm 34, which extends through an aperture in the front panel. The front end of support arm 34 is slotted on one side so as to accommodate a cutter blade 36 which is mounted in line with the small gap 28 between the two splicing blocks 24 and 26, with its cutting edge facing down and inclined. Arm 34 is mounted for reciprocal movement perpendicular to the front panel. Arm 34 is normally withdrawn far enough so that the front end of the cutting blade 36 will not interfere with movement of magnetic tape along the grooves in blocks 24 and 26. When arm 34 is moved forward, the cutting edge of blade 36 slices through the magnetic tape (or leader) extending across from the groove in block 24 to one of the grooves in block 26.

The splicer 4 is adapted to apply a piece of adhesive-backed splicing tape 12 to the abutting ends of two tapes supported by splicing blocks 24 and 26.

Plate 8 is provided with means for rotatably supporting the supply reel 10 of splicing tape 12 which is coated on one side with a pressure-sensitive adhesive. Such means may comprise a hub 38 having an enlarged flange attached to its rear end. The reel 10 fits over hub 38 and is held in place by suitable means, e.g., a plastic cap 40 which is adapted to slip over and make a friction fit with the hub 38. The reel 10 is positioned on hub 38 so as to be in planar alignment with feed wheels 14 and 16.

Feed wheel 14 surrounds, and is secured to, a clutch housing (not shown) that projects through plate 8. A shaft 42 extends through and is coupled to the clutch housing. Shaft 42 is concentric with wheel 14. The clutch is made so that if shaft 42 is urged clockwise (as seen in FIG. 1), feed wheel 14 will rotate with shaft 42. On the other hand, if shaft 42 is urged in a counterclockwise direction, then shaft 42 will rotate without causing rotation of wheel 14. Affixed to shaft 42 is a first spur gear 44 which is connected to feed wheel 14 so that they rotate as a unit.

Feed wheel 14 has a circumferential groove (not shown) in its periphery that is just wide enough to receive the splicing tape 12. Feed wheel 14 is mounted so that this groove is located in planar alignment with tape supply reel 10. Also affixed to plate 8 is a short stub shaft 46. Rotatably mounted on stub shaft 46 are a second smaller spur gear 48 and the smaller splicing tape feed wheel 16. Gear 48 is connected to wheel 16 so that they can rotate as a unit. Gear 48 meshes with gear 44, and feed wheel 16 has a circumferential groove (not shown) which is located in coplanar relation with the circumferential groove of tape feed wheel 14, both grooves being just wide enough to accommodate splicing tape 12. A snap ring 50, secured in a groove (not shown) on shaft 46, holds feed wheel 16 on shaft 46. A tape guide pin 52 is also affixed to plate 8 below feed wheel 16. Pin 52 has a peripheral groove as shown in phantom at 54 (FIG. 1) which has the same width as, and is in planar alignment with, the grooves in wheels 14 and 16.

Also attached to plate 8 is a spring latch 56 having a finger 58 which presses against the teeth of gear 44 and prevents rotation of that gear under the influence of shock and vibration when no rotational force is being exerted on drive shaft 42.

Mounted above stub shaft 46 on plate 8 is a small block 60. Attached to block 60 and projecting from its bottom end are two vertically-extending guide pins 62 which lie in a plane extending at a right angle to the plane of plate 8 and are spaced from one another by an amount only slightly greater than the width of splicing tape 12, so that the tape can move between the guide pins while being effectively restricted against sideways movement. Pins 62 terminate near feed wheel 16 and are located so that they straddle the circumferential tape groove of wheel 16. Also attached to block 60 is a plate 64 carrying a rubber pressure roller 66 which has approximately the same width as splicing tape 12 and is positioned so as to press the tape into the circumferential groove of feed wheel 16.

Also mounted to plate 8 by a screw 68 is a tape picker 70. Tape picker 70 is located between feed wheel 16 and a plunger guide member 72 (hereinafter described) and is formed so that its upper end has a flat surface 74. Picker 70 has a thickness (defined as the dimension normal to the plane of plate 8) slightly less than the width of the groove in wheel 16 and is positioned so that it extends into the groove, and its surface 74 is tangent to the surface of the groove in feed wheel 16.

Also carried by plate 8 are two vertically-extending plunger guide members 72 and 76 that define a vertical plunger guide channel 78. These members are spaced from each other and are connected at their top ends by a horizontally-extending block 80, which serves as a mounting plate for actuator 18. The opposite ends of actuator 18 are provided with hose fittings 82 (only one of which is shown) for admitting air to the actuator. The piston rod 20 of actuator 18 extends through aligned oversized holes (not shown) in mounting block 80 down into channel 78. Attached to the end of rod 20 is the plunger 2. The at-rest position of plunger 2 is as seen in FIG. 1. On its downward stroke, plunger 2 moves down far enough to cause pressure pad 6 (hereinafter described) to tightly press the severed piece of splicing tape 12 against the tapes to be spliced, which are positioned on splicing blocks 24 and 26.

Guide member 76 is provided with a vertically extending slot (not shown) which faces guide channel 78 and is sized to slidably and snugly receive a rib 86 (FIG. 2) formed integral with plunger 2. The slot cooperates with rib 86 to guide plunger 2 as it is reciprocated by operation of actuator 18. The slot also serves as a guide for the leading end of tape 12, as described more fully below. To assure proper splicing tape alignment, the slot has a width substantially identical to the gap between pins 62. The plunger 2 has a longitudinally-extending slot 88 in its side opposite rib 86, and mounted in this slot by means of a fastener 90 (shown in phantom in FIG. 1) is a cutter member 92. Cutter member 92 slidably engages the inner surface of guide member 72, and member 72 has a horizontal slit (not shown) through its thickness which is sized to accommodate the splicing tape 12.

As shown in FIG. 2, pressure pad 6 is attached to the bottom surface of plunger 2. The peripheral dimensions of pad 6 are substantially equal to the corresponding dimensions of the plunger bottom surface to which pad 6 is bonded. Pad 6 is attached to plunger 2 by suitable means such as an adhesive. Although pad 6 appears to have an almost square configuration as seen in FIG. 2, the exact configuration is actually rectangular, since the length of pad 6 (the length being defined as the horizontal dimension of pad 6 which is parallel with the plane of carriage plate 8 as seen in FIG. 1) is greater than the width of the pad (the width being defined as the dimension normal to the plane of plate 8). Two vacuum apertures 94 penetrate the thickness of pad 6 (the thickness being defined as the dimension normal to the bottom surface of plunger 2). Apertures 94 communicate with aligned holes (not shown) in plunger 2 which lead to a chamber (not shown) within the body of plunger 2. That chamber in turn is connected to a vacuum source (not shown) through a vacuum opening 95 in the lower front portion of plunger 2 which is adapted to receive a hose fitting for a hose (not shown) which leads to a suitable vacuum source. In this way, a suction force may be applied to the bottom of pressure pad 6.

Also illustrated in FIG. 2 are two sets of orthogonal kerf-like cuts or slots 96 and 98 in the bottom portion of pressure pad 6. Slots 96 are parallel to each other and oriented in the direction of the pad width, while slots 98 are also parallel to each other and are oriented in the direction of the length of pad 6. Although there are many acceptable patterns conceivable, slots 96 and 98 are preferably perpendicular to each other so as to result in a reticulated or criss-crossed pattern on the bottom surface of pad 6. The resulting surface areas between slots 96 and 98 are either rectangular or square. The depth of the slots 96 and 98 is substantially constant and extends through only part of the thickness of pad 6. Preferably slots 96 and 98 extend through only about half the thickness of pad 6. The slots preferably are very narrow, preferably small enough to be characterized as "knife cuts". Typically the slots have a width on the order of 0.2 millimeters, although narrower or wider slots may be suitable depending upon the vacuum source, the overall size of the pad, and the nature of the adhesive splicing tape. Slots 96 are typically separated from each other by about 0.5 millimeters (as are slots 98); again, more or less separation may be acceptable depending on the factors listed in the immediately preceding sentence.

Operation of the plunger mechanism and the associated pressure pad 6 of the present invention will now be described. Reference may be made to U.S. Pat. No. 3,753,835 for more complete details of the plunger operation. Plunger 2 is reciprocated up and down by means of the actuator 18. When piston rod 20 is fully retracted, plunger 2 is in its uppermost position shown in FIG. 1. When plunger 2 is in this uppermost position, splicing tape 12 may be fed into the space beneath pressure pad 6 by means of tape feed wheels 14 and 16, rubber roller 66, and pins 62.

Assume that in the course of winding tape into a cassette, the cutter blade 36 has completed a cutting operation, and the movable splicer block 26 is properly positioned for a tape splicing operation, e.g., the leading end of a magnetic tape to be wound into a cassette is located in its inner groove (the one closest to the machine front panel) in alignment with a leader positioned in the tape receiving groove of stationary block 24. Assume also that splicing tape 12 has been advanced far enough so that its leading end engages the surface defining the base of the groove in guide member 76, whereby the free end of the splicing tape lies flat against and is aligned with pad 6.

If splicer 4 is arranged so that plate 8 is to be moved toward the splicing block assembly 22 in order for a splicing operation to be conducted, the first step in the splicing operation is to vertically lower plate 8 far enough for guide members 72 and 76 to engage, or nearly engage, the top surface of splicing blocks 24 and 26. Then with the carriage plate in this lower position, actuator 18 is operated so as to cause plunger 2 to move downward in channel 78. As plunger 2 moves downwardly, cutter member 92 severs the splicing tape 12 by a shearing action at the point where the tape comes through the slit in guide member 72. The severed portion of splicing tape 12, aligned with pad 6, is driven downwardly by plunger 2 into tight engagement with the abutting ends of the leader tape in the groove of splicer block 24 and the magnetic tape in the aligned groove of movable splicer block 26, whereby the pressure-sensitive adhesive coating on splicing tape 12 causes the splicing tape to be attached to the two tapes. Vacuum is applied to the bottom of plunger 2 via opening 95 until the plunger reaches the splicing block assembly 22 whereupon the vacuum is abruptly terminated. Immediately thereafter, actuator 18 is caused to raise plunger 2 back to its original position. The severed splicing tape 12 remains in contact with the spliced tapes on the splicing blocks as plunger 2 moves upwardly again to its original position. Plate 8 is also moved upwardly again to its original raised position. As plate 8 moves upwardly, shaft 42 is rotated to cause gears 44 and 48 to rotate clockwise and counter-clockwise, respectively (as seen in FIG. 1), so as to advance an additional length of splicing tape 12 into channel 78 between guide members 72 and 76 in anticipation of the next cycle of operation of the splicer 4 as above described.

In the course of loading magnetic tape into a cassette, splicer 4 is operated twice in the manner above described so as to apply a section of adhesive-backed splicing tape 12 to the abutting ends of two tapes to be spliced, i.e., first to splice the leading end of a length of magnetic tape to a leader attached to one hub, and second to splice the trailing end of the same length of magnetic tape to a leader attached to the other cassette hub.

A splicer made in accordance with this invention offers a number of advantages over the device disclosed in U.S. Pat. No. 3,753,835.

First of all, slots 96 and 98 of pad 6 effectively spread the vacuum suction force over the entire surface area of the pad. Secondly, the splicer 4 produces a better splice than the same mechanism described in U.S. Pat. No. 3,753,835, since the pad 6 prevents the formation of air bubbles in the resulting splice. Thirdly, the invention may be incorporated in other types of splicers, e.g., splicers wherein the splicer remains stationary relative to the tapes to be spliced, but the plunger reciprocates toward and away from said tapes. Other advantages will be obvious to persons skilled in the art.

It is to be understood that the illustrated device may be modified without departing from the essence of the invention. Thus, for example, the splicer may be installed in a machine where the plate 8 is held stationary close to the splicing block assembly 22, and a different mechanism may be employed for causing shaft 42 to be rotated a limited amount each time a splicing operation is conducted. Still other changes will be obvious to persons skilled in the art.

What is claimed is:

1. In combination with a splicing tape dispenser-applicator mechanism comprising: means for feeding an elongate splicing tape, guide means for positioning the leading end of said tape as it is advanced by said tape feeding means, cutting means for severing a length of said tape including the leading end thereof at a selected point relative to said guide means, and means for dispensing said length of tape severed by said cutting means comprising (1) a plunger disposed within a guide channel, (2) means for releasably holding said severed length of tape against the bottom surface of said plunger, and (3) a pressure member attached to said plunger bottom surface for pressing said severed length of tape onto materials to be spliced, the improvement comprising an improved pressure member in the form of a resilient pad having a multiplicity of intersecting cuts so as to form a reticulated bottom surface, said pad having one or more apertures through its thickness to provide pressure communication between said cuts and one or more corresponding vacuum source passageways within said plunger.

2. In combination with a machine for loading a selected supply tape into a cassette which includes a tape leader, said machine having a splicing block assembly for supporting the leading end of the supply tape and the leader of the cassette to be loaded, and improved splicing means for splicing a section of said leader and said supply tape together, said improved splicing means comprising in combination:

means for feeding an elongate splicing tape;
tape feed operating means for operating said tape feed means so that a predetermined amount of tape is advanced by said tape feeding means;
guide means for positioning the leading end of said tape as it is advanced by said tape feeding means;
cutting means for severing a length of said tape including the leading end thereof at a selected point relative to said guide means;
a plunger guide channel;
means for dispensing said severed length of tape comprising a plunger disposed within said guide channel;
means for releasably holding said severed length of tape against the bottom surface of said plunger; and
a pressure member attached to said plunger bottom surface for forcing said severed length of tape onto materials to be spliced, said pressure member comprising a resilient pad having a bottom surface characterized by criss-crossed slots penetrating perpendicular to said surface, said pad having one or more apertures through its thickness to provide vacuum communication between said slots and one or more corresponding vacuum passageways within said plunger.

3. Improved splicing means according to claim 2, wherein said slots have a width of about 0.2 millimeters.

4. Improved splicing means according to claim 3, wherein said slots form a regular orthogonally-intersecting pattern on said bottom surface of said pressure pad.

5. Improved splicing means according to claim 4, wherein parallel slots of said orthogonally-intersecting slots are separated by about 0.5 millimeters.

* * * * *